(12) United States Patent
Tsunoda et al.

(10) Patent No.: US 9,365,238 B2
(45) Date of Patent: Jun. 14, 2016

(54) ELECTRIC POWER STEERING APPARATUS

(71) Applicant: NSK LTD., Shinagawa-ku, Tokyo (JP)

(72) Inventors: Mikihiko Tsunoda, Gunma (JP); Tamotsu Oumi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/443,729

(22) PCT Filed: Dec. 16, 2014

(86) PCT No.: PCT/JP2014/006269
§ 371 (c)(1),
(2) Date: May 19, 2015

(87) PCT Pub. No.: WO2015/107601
PCT Pub. Date: Jul. 23, 2015

(65) Prior Publication Data
US 2015/0367881 A1    Dec. 24, 2015

(30) Foreign Application Priority Data

Jan. 17, 2014    (JP) ................................. 2014-007009

(51) Int. Cl.
*B62D 6/00*    (2006.01)
*B62D 5/04*    (2006.01)
(Continued)

(52) U.S. Cl.
CPC ........... *B62D 5/0484* (2013.01); *B60W 50/029* (2013.01); *B62D 5/049* (2013.01);
(Continued)

(58) Field of Classification Search
CPC ...... G01L 25/003; G01L 5/221; B62D 5/049; B62D 5/0463; B60W 50/029; B60W 2540/18
USPC ................................................ 701/36, 41, 43
See application file for complete search history.

(56) References Cited

U.S. PATENT DOCUMENTS

| | | | | |
|---|---|---|---|---|
| 2011/0066327 A1* | 3/2011 | Horiuchi | ............... | B62D 5/0406 701/41 |
| 2012/0197493 A1* | 8/2012 | Fujimoto | ............. | B62D 15/024 701/41 |

(Continued)

FOREIGN PATENT DOCUMENTS

| | | |
|---|---|---|
| JP | 2007-196829 A | 8/2007 |
| JP | 2012-45990 A | 3/2012 |

(Continued)

OTHER PUBLICATIONS

International Search Report (PCT/ISA/210) dated Mar. 17, 2015, with partial English translation (four (4) pages).

(Continued)

*Primary Examiner* — Thomas G Black
*Assistant Examiner* — Sze-Hon Kong
(74) *Attorney, Agent, or Firm* — Crowell & Moring LLP

(57) ABSTRACT

There is provided an electric power steering device capable of detecting steering torque with high accuracy without use of a torque sensor, and capable of performing appropriate steering assistance control. An alternative torque correction value (Tc) is operated by comparing alternative torque (T0) operated based on an angle signal at normal time of the torque sensor (3) with a torque detection value (Ti) detected by the torque sensor (3), and is then stored. Then, at normal time of the torque sensor (3), the steering assistance control is performed based on the torque detection value (Ti) detected by the torque sensor (3), whereas when an abnormality happens in the torque sensor (3), the steering assistance control is performed based on corrected alternative torque (T1) obtained by correcting the alternative torque (T0) by the alternative torque correction value (Tc).

8 Claims, 4 Drawing Sheets

(51) Int. Cl.
- *G01L 5/22* (2006.01)
- *G01L 25/00* (2006.01)
- *B60W 50/029* (2012.01)
- *B62D 6/10* (2006.01)

(52) U.S. Cl.
CPC ........... *B62D 5/0463* (2013.01); *B62D 5/0487* (2013.01); *B62D 6/10* (2013.01); *G01L 5/221* (2013.01); *G01L 25/003* (2013.01); *B60W 2540/18* (2013.01)

(56) References Cited

U.S. PATENT DOCUMENTS

| | | | |
|---|---|---|---|
| 2014/0324294 A1* | 10/2014 | Champagne | B62D 5/0463 701/41 |
| 2014/0358375 A1* | 12/2014 | Sakai | B62D 5/0463 701/41 |
| 2014/0360803 A1* | 12/2014 | Hori | B62D 5/0484 180/446 |
| 2015/0046036 A1* | 2/2015 | Sasaki | G01L 5/221 701/41 |
| 2015/0066305 A1* | 3/2015 | Kodera | B62D 5/0472 701/43 |
| 2015/0066306 A1* | 3/2015 | Kodera | B62D 5/0466 701/43 |
| 2015/0291210 A1* | 10/2015 | Kageyama | B60T 8/1755 701/41 |
| 2015/0298726 A1* | 10/2015 | Aoki | B62D 5/0463 701/43 |

FOREIGN PATENT DOCUMENTS

| | | |
|---|---|---|
| JP | 2012-101674 A | 5/2012 |
| JP | 2012-228922 A | 11/2012 |
| JP | 2013-147175 A | 8/2013 |

OTHER PUBLICATIONS

Written Opinion dated Mar. 17, 2015, with English translation (six (6) pages).

* cited by examiner

ELECTRIC POWER STEERING APPARATUS

TECHNICAL FIELD

The present disclosure relates to an electric power steering device including an electric motor that generates steering assisting torque to be applied to a steering mechanism.

BACKGROUND ART

These days, in an electric power steering device, construction of a double system, for example, is demanded in order to maintain normal operations even when an abnormality happens in one of its elements. For the abnormality that happens in a torque sensor, a double system may be constructed by providing two torque sensors, but the cost is high in that case.

Therefore, there is a technique described in Patent Literature 1, for example, for constructing a double system without providing two torque sensors. In this technique, at normal time of a torque sensor, steering assistance control is carried out by using a torque sensor value, whereas at abnormal time of the torque sensor, the steering assistance control is carried out by using steering torque that is calculated by using a motor rotation angle sensor and a steering angle sensor. Here, by counting a cycle of a detection signal of the motor rotation angle sensor and a cycle of a detection signal of the steering angle sensor, respectively, absolute angles are respectively calculated, so that the steering torque is calculated based on a difference (a relative angle) between the absolute angles.

CITATION LIST

Patent Literature

PTL 1: JP 2012-228922 A

SUMMARY OF INVENTION

Technical Problem

In the technique described in Patent Literature 1, however, it is necessary to provide both the steering angle sensor and the motor rotation angle sensor. Also, when there is an error between the steering torque, which is calculated by using the steering angle sensor and the motor rotation angle sensor, and a torque sensor value at normal time, it is not possible to carry out the steering assistance control appropriately at abnormal time of the torque sensor. Hence, uncomfortable feeling might be given to a driver.

Thus, the present disclosure aims to provide an electric power steering device capable of detecting the steering torque accurately without using a torque sensor to carry out appropriate steering assistance control.

Solution to Problem

In order to solve the above problem, according to an aspect of the present invention, there is provided an electric power steering device provided with an electric motor that applies a steering assisting force to a steering system to reduce a steering load of a driver, the electric power steering device including: a torque sensor configured to detect steering torque to be inputted to a steering mechanism; a steering torque operation unit configured to operate the steering torque to be inputted to the steering mechanism based on at least one of a steering angle of a steering wheel detected by the electric power steering device or obtained through an on-vehicle network, and a rotation angle of the electric motor; a torque sensor abnormality detection unit configured to detect an abnormality of the torque sensor; a correction value operation unit configured to compare the steering torque operated by the steering torque operation unit with the steering torque detected by the torque sensor, and to operate a correction value of the steering torque operated by the steering torque operation unit, when the torque sensor abnormality detection unit detects no abnormality of the torque sensor; a correction value storage unit configured to store the correction value operated by the correction value operation unit, in a nonvolatile memory; and a motor control unit configured to perform drive control of the electric motor based on the steering torque detected by the torque sensor, when the torque sensor abnormality detection unit detects no abnormality of the torque sensor, and to perform the drive control of the electric motor based on a corrected steering torque obtained by correcting the steering torque operated by the steering torque operation unit with the correction value stored by the correction value storage unit, when the torque sensor abnormality detection unit detects the abnormality of the torque sensor.

DESCRIPTION OF EMBODIMENTS

Embodiments of the present disclosure will now be described with reference to the drawings.

(Structure)

Figure 1:
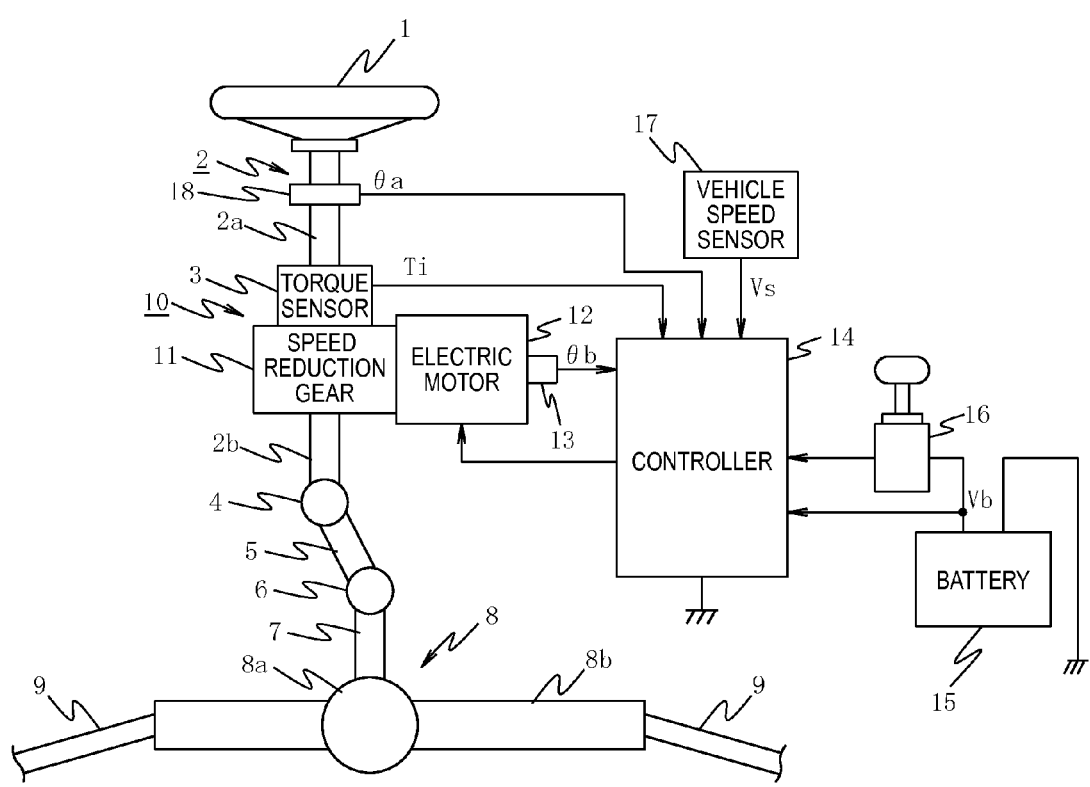
FIG. 1 is an entire structural view illustrative of an electric power steering device provided with a steering torque detection device in one embodiment of the present disclosure.

FIG. 1 is an entire structural view illustrative of an electric power steering device provided with a steering torque detection device in one embodiment.

In the drawing, reference numeral 1 represents a steering wheel of a vehicle, and steering force applied to the steering wheel 1 by a driver is transmitted to a steering shaft 2 having an input shaft 2a and an output shaft 2b. In the steering shaft 2, one end of the input shaft 2a is connected with the steering wheel 1, and the other end thereof is connected with one end of the output shaft 2b through a torque sensor 3. A torsion bar, not illustrated, is interposed between the input shaft 2a and the output shaft 2b. In the input shaft 2a, a steering angle sensor 18 is arranged, which detects a steering angle θa of the steering wheel 1.

Then, the steering force transmitted to the output shaft 2b is transmitted to an intermediate shaft 5 through a universal joint 4, and further transmitted to a pinion shaft 7 through a universal joint 6. The steering force transmitted to the pinion shaft 7 is transmitted to tie rods 9 through a steering gear 8, thus steering non-illustrated steered wheels. Here, the steering gear 8 is configured as a rack and pinion system that includes a pinion 8a connected with the pinion shaft 7, and a rack 8b meshing with the pinion 8a, and converts a rotary motion transmitted to the pinion 8a into a linear motion at the rack 8b.

A steering assist mechanism 10, which transmits steering assisting force to the output shaft 2b, is connected with the output shaft 2b of the steering shaft 2. The steering assist mechanism 10 is provided with a speed reduction gear 11 connected with the output shaft 2b, and an electric motor 12 that is connected with the speed reduction gear 11 and generates assisting steering force for the steering system.

The torque sensor 3 is for detecting steering torque that is applied to the steering wheel 1 and transmitted to the input shaft 2a, and is configured to detect a relative displacement (a rotational displacement) between the input shaft 2a and the output shaft 2b, which are connected with each other by the torsion bar, not illustrated, in correspondence to an impedance change of a pair of coils. A torque detection value Ti outputted from the torque sensor 3 is inputted to a controller (ECU) 14.

The controller 14 is activated as power is supplied from a battery 15 that serves as an on-vehicle power source. A negative electrode of the battery 15 is grounded, and the positive electrode thereof is connected with the controller 14 through an ignition switch 16 that starts an engine, and is also directly connected with the controller 14 without the ignition switch 16.

In addition to the torque detection value Ti, a vehicle speed detection value Vs detected by a vehicle speed sensor 17, a steering angle θa detected by the steering angle sensor 18, and a motor rotation angle θb detected by a motor rotation angle sensor 13 attached to the electric motor 12 are inputted to the controller 14.

As the motor rotation angle sensor 13, for example, a resolver, a magnetic sensor, an optical sensor, and the like, which are capable of detecting an angle, may be used. Also, as the vehicle speed sensor 17, a sensor may be used, which detects rotation speed of each of wheels, not illustrated, or so-called wheel speed Vwj (j=FL, FR, RL, RR), calculates a vehicle speed Vs from an average value of speeds of left and right wheels of non-driving wheels, out of the respective wheel speeds Vwj, and outputs the vehicle speed Vs.

Then, the controller 14 carries out steering assistance control, in which the steering assisting force in accordance with them is applied to the steering system. To be specific, the controller 14 calculates a steering assisting torque command value, which is for the electric motor 12 to generate the above-mentioned steering assisting force, by publicly-known procedures, and calculates a current command value for the electric motor 12 based on the calculated steering assistance command value. Then, the controller 14 performs feedback control of drive current to be supplied to the electric motor 12 based on the current command value and a motor current detection value.

In one embodiment, an abnormality of the torque sensor 3 is detected by determining whether or not the torque detection value Ti shows an abnormal value. Then, at normal time when there is no abnormality in the torque sensor 3, the controller 14 performs the steering assistance control in which the steering assisting force is applied to the steering system in accordance with the torque detection value Ti and the vehicle speed Vs. On the other hand, at abnormal time when an abnormality happens in the torque sensor 3, the controller 14 performs steering assistance control by using an alternative torque T1, instead of the torque detection value Ti, in which the alternative torque T1 is calculated based on a steering angle θa from the steering angle sensor 18 and a motor rotation angle θb detected by the motor rotation angle sensor 13.

Figure 2:
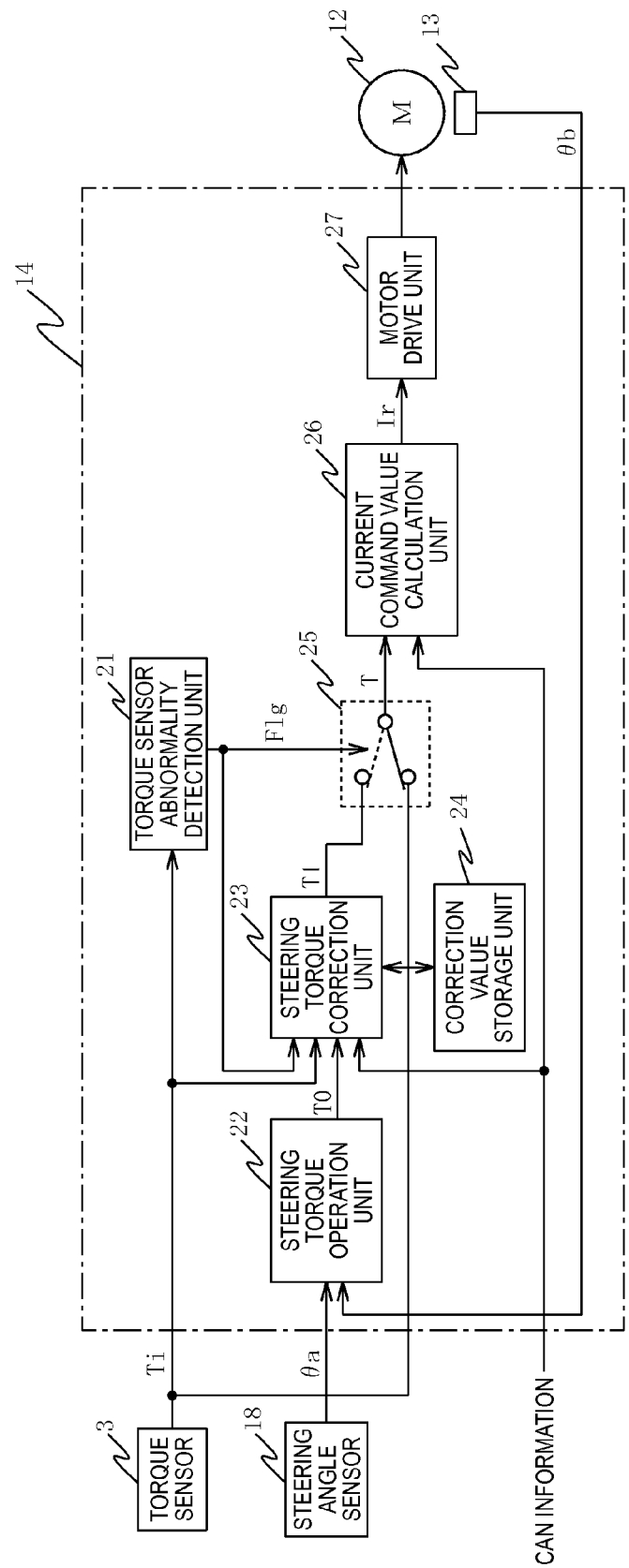
FIG. 2 is a block diagram illustrative of a structure of a controller.

Next, a specific structure of the controller 14 is described. As illustrated in FIG. 2, the controller 14 is configured to include a torque sensor abnormality detection unit 21, a steering torque operation unit 22, a steering torque correction unit 23, a correction value storage unit 24, a switching unit 25, a current command value calculation unit 26, and a motor drive unit 27.

The torque sensor abnormality detection unit 21 is configured to detect an abnormality of an output value of the torque sensor 3, and outputs the result as an abnormality detection flag Flg to the steering torque correction unit 23 and the switching unit 25.

At normal time, the output value from the torque sensor 3 has cross characteristics where a main torque signal and a sub-torque signal are crossed. A rated range of the torque sensor 3 is 0V to 5V, and a normally used range is 1V to 4V, which is set by a mechanical stopper (a twisting range of the torsion bar, and the like) to fall within a smaller range of the above-mentioned rated range. In a case where short circuiting or grounding occurs in the torque sensor 3, the main torque signal and the sub-torque signal are fixed to the upper and lower limits (0V, 5V) of the rated range of the torque sensor 3.

Thus, when the main torque signal and the sub-torque signal are a predetermined value near 0V (for example, 0.3V) or smaller, or a predetermined value near 5V (for example, 4.7V) or larger, the torque sensor abnormality detection unit 21 is configured to determine that the main torque signal and the sub-torque signal are deviated from normal cross characteristics, and to set the abnormality detection flag Flg to "1" indicating that the abnormality happens in the torque sensor 3. Then, when the main torque signal and the sub-torque signal have normal cross characteristics, the torque sensor abnormality detection unit 21 is configured to set the abnormality detection flag Flg to "0" indicating that no abnormality happens in the torque sensor 3.

The steering torque operation unit 22 is configured to receive inputs of the steering angle θa detected by the steering angle sensor 18 and the motor rotation angle θb detected by the motor rotation angle sensor 13, and to operate alternative torque T0 based on the steering angle θa and the motor rotation angle θb. Here, the steering torque operation unit 22 is configured to operate the alternative torque T0 based on values obtained by differentiating the steering angle θa and the motor rotation angle θb (amounts of change per unit time).

At normal time of the torque sensor 3 (when Flg=0), the steering torque correction unit 23 is configured to compare the alternative torque T0 operated by the steering torque operation unit 22 with the torque detection value Ti detected by the torque sensor 3. Then, when a difference between them is equal to a threshold value Tth or larger, the steering torque correction unit 23 is configured to operate an alternative torque correction value Tc for correcting an error of the alternative torque T0.

Here, the steering torque correction unit 23 operates a difference between the alternative torque T0 and the torque detection value Ti as an alternative torque correction value Tc. The operated alternative torque correction value Tc (=Ti−T0) is stored in the correction value storage unit 24. The correction value storage unit 24 is configured with a nonvolatile memory.

While the torque sensor 3 is normal, the alternative torque correction value Tc may be operated repeatedly based on a normal torque detection value Ti, and an average value of the alternative torque correction values Tc operated for a constant period of time may be stored in the correction value storage unit 24.

Further, when an abnormality happens in the torque sensor 3 (when Flg=1), the steering torque correction unit 23 is configured to correct the alternative torque T0 operated by the steering torque operation unit 22, by using the alternative torque correction value Tc stored in the correction value storage unit 24 at normal time of the torque sensor 3. Then, the steering torque correction unit 23 is configured to output the result as corrected alternative torque T1.

The switching unit 25 has two input terminals and one output terminal. The corrected alternative torque T1 outputted from the steering torque correction unit 23 is inputted to one of the two input terminals, and the torque detection value Ti detected by the torque sensor 3 is inputted to the other one. Then, when the torque sensor abnormality detection unit 21 inputs Flg=0, a changeover switch is brought into a state indicated by a solid line, and the torque detection value Ti is outputted as the steering torque T from the output terminal. On the other hand, when Flg=1 is inputted from the torque sensor abnormality detection unit 21, the changeover switch is brought into a state indicated by a broken line, and the steering torque T1 is outputted as the steering torque T from the output terminal. The steering torque T outputted from the output terminal is inputted to the current command value calculation unit 26.

The current command value calculation unit 26 is configured to calculate a steering assisting torque command value by using known procedures based on the steering torque T outputted from the switching unit 25, and vehicle speed Vs detected by the vehicle speed sensor 17 as information obtained through an on-vehicle network CAN (Controller Area Network) (hereinafter, referred to as "CAN information"), and also calculates a current command value Ir for carrying out feedback control of the drive current to be supplied to the electric motor 12, based on the steering assisting torque command value and a motor current detection value.

The motor drive unit 27 controls electric conduction of the electric motor 12 based on the current command value Ir outputted from the current command value calculation unit 26.

Hereinafter, steering assistance control processing carried out by the controller 14 will described specifically.

Figure 3:
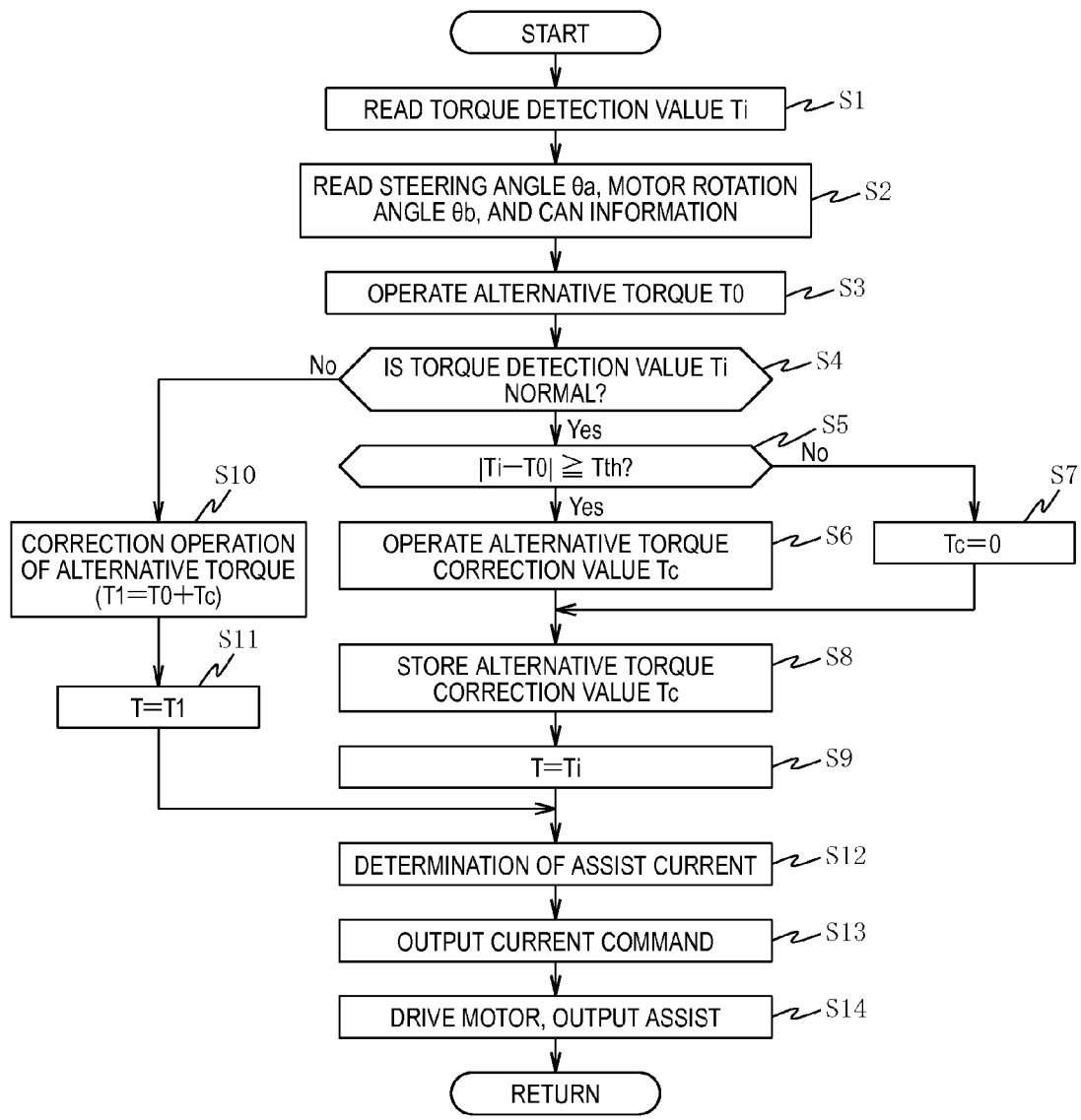
FIG. 3 is a flowchart illustrative of steering assistance control processing steps carried out in the controller.

FIG. 3 is a flowchart illustrative of steering assistance control processing steps carried out by the controller 14.

First, in step S1, the controller 14 reads a torque detection value Ti from the torque sensor 3, and processing moves to step S2.

In step S2, the controller 14 reads a steering angle θa from the steering angle sensor 18, and also reads a rotation angle θb from the motor rotation angle sensor θb. Also, the controller 14 receives inputs of ambient temperature (or atmospheric temperature) Temp, power supply voltage Vdd, vehicle speed Vs, and a yaw rate γ, as the CAN information.

Next, in step S3, the controller 14 calculates first angle torque Δθa, which is obtained by multiplying a differential value of the steering angle θa by a predetermined coefficient and converting the resultant value into a dimension of steering torque, and also calculates second angle torque Δθb, which is obtained by multiplying a differential value of the motor rotation angle θb by a predetermined coefficient and converting the resultant value into the dimension of steering torque. Then, the controller 14 calculates an average value θave of the first angle torque Δθa and the second angle torque Δθb, as the alternative torque T0.

In step S4, the controller 14 determines whether or not the torque detection value Ti is normal (Flg=0). In the case of Flg=0, the processing moves to step S5, whereas in the case of Flg=1, the processing moves to step S10 to be described later.

In step S5, the controller 14 compares the alternative torque T0 calculated in step S3 stated above, with the torque detection value Ti read in step S1 stated above, and determines whether or not the difference |Ti−T0| is a previously-determined threshold value Tth or larger. Then, in the case of |Ti−T0|>=Tth, it is determined that an error of the alternative torque T0 is large, and the processing moves to step S6.

In step S6, the controller 14 calculates the alternative torque correction value Tc for correcting the alternative torque T0, and the processing moves to step S8 to be described later. Here, a steering torque difference value (Ti−T0), which is a difference between the actual torque (the torque detection value Ti) and the calculated alternative torque T0, is operated as an alternative torque correction value Tc.

Further, in step S5 stated above, when it is determined that |Ti−T0|<Tth, it is determined that an error of the alternative torque T0 is so small that correction of the alternative torque T0 is not necessary, and the processing moves to step S7. Then, in step S7, the controller 14 sets the alternative torque correction value Tc=0, and the processing moves to step S8.

In step S8, the controller 14 stores the alternative torque correction value Tc, which is calculated in above-described step S6 or step S7, in the correction value storage unit 24, and the processing moves to step S9.

In step S9, the controller 14 sets the torque detection value Ti read in aforementioned step S1, as steering torque T to be used for steering assistance control (T=Ti), and the processing moves to step S12 described later.

In step S10, the controller 14 performs correction operation for alternative torque. Specifically, as illustrated in FIG. 4, the controller 14 operates corrected alternative torque T1 by adding an ultimate alternative torque correction value Tc to the alternative torque T0 operated in above-described step S3 (T1=T0+Tc), in which the ultimate alternative torque correction value Tc is obtained by multiplying the alternative torque correction value Tc (the steering torque difference value (Ti−T0)) stored in the correction value storage unit 24 by plural external factor gains in accordance with CAN information.

As the external factor gains, a voltage gain Gd (a power supply voltage sensitivity gain), a vehicle speed gain Gv (a vehicle speed sensitivity gain), a temperature gain Gt (an ambient temperature sensitivity gain), and a yaw gain Gy (a yaw rate sensitivity gain) are used. In other words, the corrected alternative torque T1 is obtained based on the expression below.

$$T1=(Ti-T0) \times Gd \times Gv \times Gt \times Gy + T0 \qquad (1)$$

Figure 4:
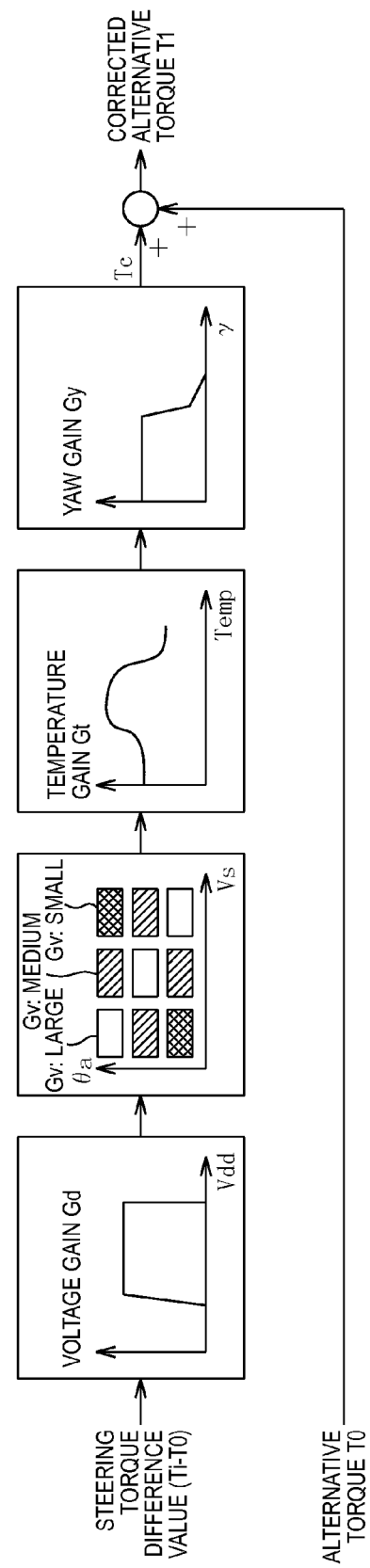
FIG. 4 is a view illustrative of a method for operating corrected alternative torque.

As illustrated in FIG. 4, the voltage gain Gd is calculated based on a map where a horizontal axis represents power supply voltage Vdd and a vertical axis represents the voltage gain Gd. Here, when the power supply voltage Vdd is a predetermined value or smaller, the voltage gain Gd is set to Gd=0, and, when the power supply voltage Vdd is larger than the predetermined value, the voltage gain Gd is set to a constant value larger than 0.

Further, as illustrated in FIG. 4, the vehicle speed gain Gv is calculated based on a map where a horizontal axis represents vehicle speed Vs, and a vertical axis represents a steering angle θa. Here, the vehicle speed gain Gv is set to a relatively large value when the vehicle speed Vs falls within a low vehicle speed range and the steering angle θa is relatively large, when both the vehicle speed Vs and the steering angle θa are at moderate levels, and when the vehicle speed Vs falls within a high vehicle speed range and the steering angle θa is relatively small. Furthermore, the vehicle speed gain Gv is set to a relatively small value when the vehicle speed Vs falls within the low vehicle speed range and the steering angle θa is relatively small, and when the vehicle speed Vs falls within the high vehicle speed range and the steering angle θa is relatively large.

An addition, as illustrated in FIG. 4, the temperature gain Gt is calculated based on a map where a horizontal axis represents ambient temperature Temp and a vertical axis represents the temperature gain Gt. Here, the temperature gain Gt is set to a relatively small value when the ambient temperature Temp is a predetermined low temperature threshold value or lower and is a predetermined high temperature threshold value or higher.

Moreover, as illustrated in FIG. 4, the yaw gain Gy is calculated based on a map where a horizontal axis represents a yaw rate γ and a vertical axis represents the yaw gain Gy. Here, in a case where the yaw rate γ is a predetermined value or smaller, the yaw gain Gy is set to a fixed value larger than 0. As the yaw rate γ becomes larger than the predetermined value, the yaw gain Gy is set to be reduced from the fixed value toward 0.

Next, in step S11, the controller 14 sets the corrected alternative torque T1 calculated in above-described step S10, as steering torque T to be used for steering assistance control (T=T1), and the processing moves to step S12.

In step S12, the controller 14 calculates a steering assisting torque command value (assist current) by publicly known procedures based on the steering torque T set in above-described step S9 or above-described step S11, and the vehicle speed Vs read in above-described step S2, and the processing moves to step S13.

In step S13, the controller 14 calculates a current command value Ir for feedback control of drive current to be supplied to the electric motor 12, based on the steering assisting torque command value calculated in above-described step S12 and the motor current detection value, and the processing moves to step S14.

In step S14, the controller 14 outputs steering assistance by performing drive control of the electric motor 12 based on the current command value Ir calculated in above-described step S13.

Note that, in FIG. 3, the processing of step S3 corresponds to the steering torque operation unit, the processing of step S4 corresponds to the torque sensor abnormality detection unit, the processing of steps S5 to S7 correspond to the correction value operation unit, the processing of step S8 corresponds to the correction value storage unit, and the processing of steps S9 to S14 corresponds to the motor control unit.

(Operations)

Next, operations of this embodiment are described. At normal time when there is no abnormality in the torque sensor 3, the torque sensor abnormality detection unit 21 in the controller 14 determines that the torque sensor 3 is normal, and outputs the abnormality detection flag Flg=0 to the switching unit 25. Thus, the switching unit 25 outputs the torque detection value Ti detected by the torque sensor 3 to the current command value calculation unit 26, as the steering torque T.

Therefore, while an automobile is turning on a curved road, the controller 14 calculates a steering assisting torque command value based on the steering torque T (=the torque detection value Ti) and the vehicle speed Vs, and then calculates the current command value Ir based on the steering assisting torque command value and the motor current detection value. Then, the controller 14 performs drive control of the electric motor 12 by the calculated current command value Ir. Thus, the torque generated in the electric motor 12 is converted into the rotation torque of the steering shaft 2 through the speed reduction gear 11, and the steering force by a driver is thus assisted.

Further, at the normal time, the controller 14 compares the torque detection value Ti detected by the torque sensor 3 with the steering torque (alternative torque) T0 operated based on the detection signal (steering angle θa) of the steering angle sensor 18 and the detection signal (motor rotation angle θb) of the motor rotation angle sensor 13. At this time, when the torque detection value Ti and the alternative torque T0 are the equal value (|Ti−T0|<Tth), the controller 14 determines that there is no operation error in the steering torque, and sets and stores the alternative torque correction value Tc=0.

Meanwhile, when a difference between the torque detection value Ti and the alternative torque T0 is large (|Ti−T0|>=Tth), the controller 14 determines that there is an operation error in the steering torque, and operates and stores a difference between the normal torque detection value Ti and the operated alternative torque T0, as the alternative torque correction value Tc.

As stated above, when there is a deviation generated between a normal torque detection value Ti and alternative torque T0 operated based on angle signals, it is possible to operate and store an alternative torque correction value Tc for correcting the deviation.

When an abnormality happens in the torque sensor 3 in this state, since the torque detection value Ti becomes an abnormal value, the torque sensor abnormality detection unit 21 in the controller 14 determines that abnormality happens in the torque sensor 3, and outputs an abnormality detection flag Flg=1 to the switching unit 25. Further, the steering torque correction unit 23 corrects the alternative torque T0, which is operated based on the steering angle θa and the motor rotation angle θb, by using the alternative torque correction value Tc, which is calculated based on the normal value of the torque detection value Ti and stored, and then outputs the result to as the corrected alternative torque T1.

Here, the corrected alternative torque T1 is a value obtained by adding the alternative torque T0, which is operated based on angle signals, to an ultimate alternative torque correction value Tc, which is obtained by multiplying the alternative torque correction value (a steering torque difference value) by the gains in accordance with CAN information. The alternative torque correction value is calculated based on the normal value of the torque detection value Ti and then stored.

As stated above, the gains corresponding to external factors are used to operate the corrected alternative torque T1. For example, as illustrated in the vehicle speed gain calculation map in FIG. 4, when the vehicle speed Vs is low and the steering angle θa is large, the vehicle speed gain Gv is set to a relatively large value, whereas when the vehicle speed Vs is high and the steering angle θa is large, the vehicle speed gain Gv is set to a relatively small value. Thus, in this case, even if the alternative torque T0, which is calculated based on angle signals, and the steering angle θa are the same, the value of the corrected alternative torque T1 becomes larger as the vehicle speed Vs is lower. In other words, it is possible to operate the corrected alternative torque T1 appropriately in accordance with external factors.

Then, the switching unit 25 outputs the corrected alternative torque T1, which is outputted from the steering torque correction unit 23, to the current command value calculation unit 26 as the steering torque T. Thus, the controller 14 performs the steering assistance control based on the steering torque T (i.e., corrected steering torque T1) and the vehicle speed Vs.

Thereafter, once the vehicle stops and the driver turns off the ignition switch 16, the alternative torque correction value Tc remains stored in the correction value storage unit 24. Therefore, when the ignition switch 16 is turned on again, if there is still an abnormality in the torque sensor 3, it is possible to operate the corrected alternative torque T1 by using the alternative torque T0 operated based on the steering angle θa and the motor rotation angle θb, and the alternative torque correction value Tc stored in the correction value storage unit 24. Hence, it is possible to carryout the steering assistance control appropriately. In other words, by storing the alternative torque correction value Tc in a nonvolatile memory, it is possible to use the alternative torque correction value Tc as an initial value at the next starting time.

As described above, in the case where an abnormality happens in the torque sensor 3, the steering assistance control continues by using the corrected alternative torque T1 that has been operated based on angle signals (the detection signal of the steering angle sensor and the detection signal of the motor rotation angle sensor), instead of the torque detection value Ti. Therefore, it is possible to configure a double system with an inexpensive structure without providing plural torque sensors.

(Effects)

In the above-mentioned embodiment, since the steering torque is calculated based on a detection signal of a steering angle sensor and a detection angle of a motor rotation angle sensor, it is possible to detect steering torque without using a torque sensor. As the steering torque is detected by using a steering angle sensor, which is used in general vehicle control, and a motor rotation angle sensor, which is used in various compensation processing in the steering assistance control, it is not necessary to install a special sensor for detecting the steering torque.

Also, at normal time when no abnormality happens in a torque sensor, a torque detection value detected in the torque sensor is used to perform the steering assistance control, whereas at abnormal time when abnormality happens in the torque sensor, the steering torque (alternative torque) calculated based on angle signals (a detection signal of the steering angle sensor and a detection signal of the motor rotation angle sensor) are used, instead of the torque detection value, to perform steering assistance control. Therefore, even if an abnormality happens in the torque sensor, it is possible to continue the steering assistance control and to apply the steering assisting force by an electric motor.

Further, at normal time of the torque sensor, the alternative torque calculated based on the angle signals, and the torque detection value detected by the torque sensor are compared with each other. If there is a deviation, a correction value is operated to correct the value thereof and then stored. Then, in a case where an abnormality happens in the torque sensor, a value is used for steering assistance control, the value being obtained by correcting the alternative torque which has been calculated based on the angle signals, by using the correction value which has been stored at normal time of the torque sensor.

As stated above, as the steering torque used for steering assistance control when an abnormality happens in the torque sensor, the value obtained by correcting the alternative torque which has been calculated based on the angle signals, by using the correction value which has been operated based on the torque detection value at normal time of the torque sensor is used, thereby achieving appropriate steering assistance control.

Further, at this time, an ultimate correction value is operated by multiplying the correction value (a difference between the alternative torque calculated based on the angle signals and torque the detection value) stored at normal time of the torque sensor by the gains corresponding to external factors. Then, the alternative torque calculated based on the angle signals is added to operate the steering torque used for steering assistance control. Therefore, even if an abnormality happens in the torque sensor, it is possible to operate the steering torque with high accuracy.

As stated above, it is possible to configure a double system without providing plural torque sensors, so that stable steering feel can be given to a driver.

MODIFICATIONS

In the above-mentioned embodiment, the description has been given to the case where the alternative torque T0 is operated based on the steering angle θa and the motor rotation angle θb. However, the alternative torque T0 may be operated based only on either one of the steering angle θa or the motor rotation angle θb. For example, in the case where the alternative torque T0 is operated based on the motor rotation angle θb, second angle torque Δθb operated based on a differential value of the motor rotation angle θb is used as the alternative torque T0 without change. In this case, even in an electric power steering device without a steering angle sensor, it is possible to configure a double system without providing plural torque sensors.

In the above-described embodiment, as illustrated in FIG. 1, the description has been given to the case where the electric power steering device is provided with the steering angle sensor 18, and the steering angle sensor 18 detects a steering angle of the steering wheel 1. However, the steering angle of the steering wheel 1 can be acquired through an on-vehicle network. Here, the on-vehicle network is a CAN and the like capable of communicating with an electronic control unit (ECU). That is, a steering angle which has been detected by the on-vehicle steering angle sensor outside the electric power steering device is acquired through the CAN, as the CAN information. Accordingly, even in an electric power steering device without a steering angle sensor, it is possible to operate the alternative torque T0 based on the steering angle of the steering wheel 1 included in the CAN information.

In one embodiment of the present disclosure, there is provided an electric power steering device provided with an electric motor that applies a steering assisting force to a steering system to reduce a steering load of a driver, the electric power steering device including: a torque sensor configured to detect steering torque to be inputted to a steering mechanism; a steering torque operation unit configured to operate the steering torque to be inputted to the steering mechanism based on at least one of a steering angle of a steering wheel detected by the electric power steering device or obtained through an on-vehicle network, and a rotation angle of the electric motor; a torque sensor abnormality detection unit configured to detect an abnormality of the torque sensor; a correction value operation unit configured to compare the steering torque operated by the steering torque operation unit with the steering torque detected by the torque sensor, and to operate a correction value of the steering torque operated by the steering torque operation unit, when the torque sensor abnormality detection unit detects no abnormality of the torque sensor; a correction value storage unit configured to store the correction value operated by the correction value operation unit, in a nonvolatile memory; and a motor control unit configured to perform drive control of the electric motor based on the steering torque detected by the torque sensor, when the torque sensor abnormality detection unit detects no abnormality of the torque sensor, and to perform the drive control of the electric motor based on a corrected steering torque obtained by correcting the steering torque operated by the steering torque operation unit with the correction value stored by the correction value storage unit, when the torque sensor abnormality detection unit detects the abnormality of the torque sensor.

As stated above, when an abnormality happens in the torque sensor, it is possible to continue the steering assistance control by using the steering torque operated based on an angle signal (at least one of a steering angle and a motor rotation angle). In other words, it is possible to configure a double system without providing plural torque sensors, so that stable steering feel can be given to a driver.

In addition, at normal time of the torque sensor, the steering torque detected by the torque sensor is compared with the steering torque operated based on the angle signal, and a correction value for the steering torque operated based on the angle signal is operated and then stored. When an abnormality happens in the torque sensor, the steering torque operated based on the angle signal is corrected by the stored correction value, and is used for the steering assistance control. Therefore, even when an abnormality happens in the torque sensor, it is possible to operate the steering torque with high accuracy, and to perform appropriate steering assistance control. Moreover, by storing the above-mentioned correction value in a nonvolatile memory, it is possible to use the correction value as an initial value at the next starting time.

In the above-described electric power steering device, in one embodiment, the steering torque operation unit is configured to operate the steering toque based on a change amount per unit time of at least one of the steering angle of the steering wheel and the rotation angle of the electric motor.

Further, in the above-described electric power steering device, in one embodiment, the correction value operation unit is configured to operate a difference between the steering torque operated by the steering torque operation unit and the steering torque detected by the torque sensor, as the correction value.

It is therefore possible to operate a correction value for correcting a deviation between the steering torque detected by the torque sensor at normal time of the torque sensor and the steering torque operated based on the angle signal. Therefore, when an abnormality happens in the torque sensor, it is possible to prevent a driver from having unconformable feeling when the steering torque based on the angle signal is used for performing the steering assistance control.

Further, in the above-described electric power steering device, in one embodiment, the motor control unit is configured to perform the drive control of the electric motor based on a value obtained by adding the steering torque operated by the steering torque operation unit to a value obtained by multiplying the correction value stored by the correction value storage unit by an external factor gain, when the torque sensor abnormality detection unit detects the abnormality of the torque sensor.

Furthermore, in the above-described electric power steering device, in one embodiment, the external factor gain is at least any one of a power supply voltage sensitivity gain, a vehicle speed sensitivity gain, an ambient temperature sensitivity gain, and a yaw rate sensitivity gain. Since gains in accordance with external factors such as a power supply voltage, a vehicle speed, an ambient temperature, and a yaw rate are used, it is possible to operate steering torque based on the angle signal with high accuracy.

In the electric power steering device according to the present disclosure, since it is possible to operate the steering torque without using a torque sensor at abnormal time of the torque sensor, it is possible to continue the steering assistance control appropriately. Thus, it is possible to configure a double system without providing plural torque sensors.

The entire contents of Japanese Patent Application Number 2014-7009 (filed on Jan. 17, 2014), to which the present application claims priority, are incorporated herein by reference.

Although is the description has been given herein with reference to a limited numbers of embodiments, the scopes of the claims are not limited thereto, and modifications of each of the embodiments based on the above disclosure are obvious to a person skilled in the art.

REFERENCE SIGNS LIST

1: STEERING WHEEL
2: STEERING SHAFT
3: TORQUE SENSOR
8: STEERING GEAR
10: STEERING ASSIST MECHANISM
13: ELECTRIC MOTOR
14: CONTROLLER
15: BATTERY
16: IGNITION SWITCH
17: VEHICLE SPEED SENSOR
18: STEERING ANGLE SENSOR
21: TORQUE SENSOR ABNORMALITY DETECTION UNIT
22: STEERING TORQUE OPERATION UNIT
23: STEERING TORQUE CORRECTION UNIT
24: CORRECTION VALUE STORAGE UNIT
25: SWITCHING UNIT
26: CURRENT COMMAND VALUE CALCULATION UNIT
27: MOTOR DRIVE UNIT

The invention claimed is:

1. An electric power steering device provided with an electric motor that applies a steering assisting force to a steering system to reduce a steering load of a driver, the electric power steering device comprising:
a torque sensor configured to detect steering torque to be inputted to a steering mechanism;
a steering torque operation unit configured to operate the steering torque to be inputted to the steering mechanism based on at least one of a steering angle of a steering wheel detected by the electric power steering device or obtained through an on-vehicle network, and a rotation angle of the electric motor;
a torque sensor abnormality detection unit configured to detect an abnormality of the torque sensor;
a correction value operation unit configured to compare the steering torque operated by the steering torque operation unit with the steering torque detected by the torque sensor, and to operate a correction value of the steering torque operated by the steering torque operation unit, when the torque sensor abnormality detection unit detects no abnormality of the torque sensor;
a correction value storage unit configured to store the correction value operated by the correction value operation unit, in a nonvolatile memory; and
a motor control unit configured to perform drive control of the electric motor based on the steering torque detected by the torque sensor, when the torque sensor abnormality detection unit detects no abnormality of the torque sensor, and to perform the drive control of the electric motor based on a corrected steering torque obtained by correcting the steering torque operated by the steering torque operation unit with the correction value stored by the correction value storage unit, when the torque sensor abnormality detection unit detects the abnormality of the torque sensor.

2. The electric power steering device according to claim 1, wherein the steering torque operation unit is configured to operate the steering toque based on a change amount per unit time of at least one of the steering angle of the steering wheel and the rotation angle of the electric motor.

3. The electric power steering device according to claim 1, wherein the correction value operation unit is configured to operate a difference between the steering torque operated by the steering torque operation unit and the steering torque detected by the torque sensor, as the correction value.

4. The electric power steering device according to claim 1, wherein the motor control unit is configured to perform the drive control of the electric motor based on a value obtained by adding the steering torque operated by the steering torque operation unit to a value obtained by multiplying the correction value stored by the correction value storage unit by an external factor gain, when the torque sensor abnormality detection unit detects the abnormality of the torque sensor.

5. The electric power steering device according to claim 4, wherein the external factor gain is at least any one of a power supply voltage sensitivity gain, a vehicle speed sensitivity gain, an ambient temperature sensitivity gain, and a yaw rate sensitivity gain.

6. The electric power steering device according to claim 2, wherein the correction value operation unit is configured to operate a difference between the steering torque operated by the steering torque operation unit and the steering torque detected by the torque sensor, as the correction value.

7. The electric power steering device according to claim 2, wherein the motor control unit is configured to perform the drive control of the electric motor based on a value obtained by adding the steering torque operated by the steering torque operation unit to a value obtained by multiplying the correction value stored by the correction value storage unit by an external factor gain, when the torque sensor abnormality detection unit detects the abnormality of the torque sensor.

8. The electric power steering device according to claim 3, wherein the motor control unit is configured to perform the drive control of the electric motor based on a value obtained by adding the steering torque operated by the steering torque operation unit to a value obtained by multiplying the correction value stored by the correction value storage unit by an external factor gain, when the torque sensor abnormality detection unit detects the abnormality of the torque sensor.

* * * * *